United States Patent [19]

So et al.

[11] Patent Number: 5,331,064

[45] Date of Patent: Jul. 19, 1994

[54] POLYBENZAZOLE COMPOSITIONS CONTAINING PENDANT POLY(AROMATIC SULFIDE) MOIETIES

[75] Inventors: Ying H. So; Thomas A. DeVilbiss, III, both of Midland, Mich.

[73] Assignee: The Dow Chemical Company, Midland, Mich.

[21] Appl. No.: 501,646

[22] Filed: Mar. 29, 1990

Related U.S. Application Data

[63] Continuation of Ser. No. 397,705, Aug. 23, 1989, abandoned.

[51] Int. Cl.$^5$ .......................................... C08F 283/00
[52] U.S. Cl. .................................. 525/435; 525/390; 525/537; 518/388
[58] Field of Search ........................ 525/527, 390, 435

[56] References Cited

U.S. PATENT DOCUMENTS

| | | | |
|---|---|---|---|
| 3,555,108 | 1/1971 | Bilow et al. | 525/537 |
| 4,533,692 | 8/1985 | Wolfe et al. | |
| 4,533,693 | 8/1985 | Wolfe | |
| 4,533,724 | 8/1985 | Wolfe et al. | |
| 4,699,634 | 10/1987 | Percec et al. | 525/537 |
| 4,703,103 | 10/1987 | Wolfe et al. | |
| 4,759,986 | 7/1988 | Marikar et al. | 428/398 |
| 4,772,678 | 9/1988 | Sybert et al. | |

FOREIGN PATENT DOCUMENTS 07617 8/1989 PCT Int'l Appl. .

OTHER PUBLICATIONS

11 Ency. Poly. Sci & Eng., *Polybenzothiazoles and Polybenzoxazoles*, 601 (J. Wiley & Sons 1988).
10 Ency. Poly. Sci & Eng., *Poly(Arylene Sulfides)*, 653 (J. Wiley & Sons 1969).
Evers, "Graft Copolymers of Rod-Like Poly(p—Phenylenebenzobisimidazole)," 29(1)Polymer Preprints 244–45 (1988).
Marrocco et al., *Rigid Rod Polymers*, Int'l App. No. PCT/US89/00391 (filed Jan. 31, 1989), Int'l Publ. No. WO89/07617.

*Primary Examiner*—John C. Bleutge
*Assistant Examiner*—Helen F. Lee

[57] ABSTRACT

Graft copolymers of polybenzazole and poly(phenylene sulfide) are synthesized by the reaction of terephthalic acid and 4,6-diaminoresorcinol with 2-(polyphenylene sulfide)terephthalic acid. The resulting graft copolymer can be cross-linked by heating to provide a cross-linked product having improved thermal stability, acid resistance, and compressive strength.

11 Claims, No Drawings

POLYBENZAZOLE COMPOSITIONS CONTAINING PENDANT POLY(AROMATIC SULFIDE) MOIETIES

CROSS-REFERENCE TO RELATED APPLICATION

This application is a continuation of copending application Ser. No. 397,705, filed Aug. 23, 1989 abandoned.

BACKGROUND OF THE INVENTION

The invention relates to polybenzazole (PBZ) polymers.

Polybenzazole (PBZ) polymers are a known class of polymers comprising polybenzoxazole (PBO), polybenzothiazole (PBT), polybenzimidazole (PBI) and copolymers of these polymers. Polybenzazole polymers ordinarily contain a plurality of mer units chosen from AB-PBZ mer units, which typically comprise:

(1) an aromatic group (Ar); and
(2) an azole ring fused with the aromatic group, and AA/BB-mer units, which typically comprise:

( 1 ) an aromatic group (Ar);
(2) a first and a second azole ring fused to the aromatic group; and
(3) a divalent organic moiety (DM), which is inert and stable under polybenzazole polymerization conditions, bonded to the 2-carbon of the first azole ring.

Mer units are usually linked by a single bond from an azole ring in one mer unit to an aromatic group (Ar) or divalent organic moiety (DM) in an adjacent mer unit. The divalent organic moieties (DM) may be aliphatic, or even in some cases may be a bond, but are usually aromatic groups. AB-PBZ and AA/BB-PBZ mer units usually comply with formulae 1(a) or (b).

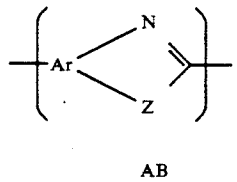

AB

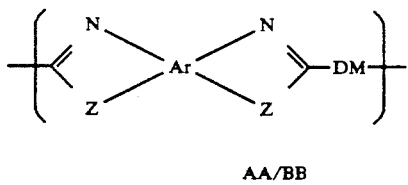

AA/BB wherein:
each Ar is an aromatic group,
DM is a bond or a divalent organic moiety which is stable and inert in acid under polymerization conditions, and
each Z is independently an oxygen atom, a sulfur atom, or a nitrogen atom that is bonded to a hydrogen atom or an organic moiety which is stable and inert in acid under polymerization conditions.

(For the purpose of this application, when the nitrogen atoms and Z moieties of an azole ring are depicted as bonded to an aromatic group without indicating their position, as in Formulae 1(a)–(b), it shall be understood that:

(1) each nitrogen atom is ortho to the Z moiety in its azole ring; and
(2) if the mer unit has two azole rings, the nitrogen atom and Z moiety of one azole ring may be in either cis position or trans position with respect to the nitrogen atom and Z moiety of the other azole ring, for example, as illustrated in Formulae 2(a) and (b).

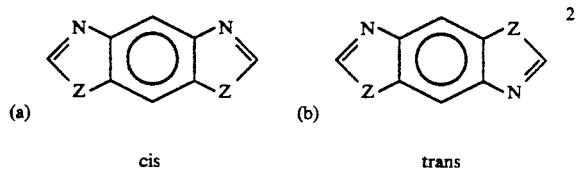

(a) cis    (b) trans

The same understandings apply with respect to amine groups and Z moieties in o-amino-basic moieties bonded to aromatic moieties. Cis and trans isomerism of PBZ polymers is illustrated in 11 Ency. Poly. Sci. & Eng., supra, at 602, which is incorporated herein by reference.)

Polybenzazoles are synthesized by the reaction of one or more difunctional monomers, each of which contains at least two azole-forming moieties chosen from the group consisting of electron-deficient carbon groups and o-amino-basic moieties. Such reactions are illustrated in formulae 2(a) and (b).

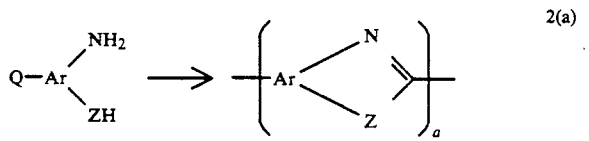

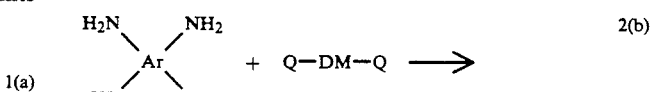

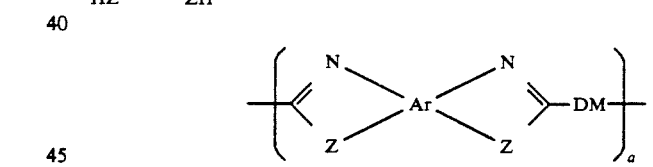

wherein each Q is an electron-deficient carbon group and all other moieties have the meaning and preferred embodiments previously given.

Polybenzazole polymers, their properties and their synthesis are discussed in detail in the following references: Sybert et al., *Liquid Crystalline Polymer Compositions, Process and Products*, U.S. Pat. No. 4,772,678 (Sep. 20, 1988): Wolfe et al., *Liquid Crystalline Polymer Compositions, Process and Products*, U.S. Pat. No. 4,703,103 (Oct. 27, 1987): Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Imai et al. "Polybenzoxazoles and Polybenzothiazoles," 83 Makromol. Chem. 167 (1965), Evers, *Thermoxadatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986) and 11 Ency. Poly. Sci. & Eng., *Polybenzothiazoles and Polybenzoxazoles*, 601 (J. Wiley & Sons 1988), which are incorporated herein by reference.

Polybenzazoles are noted for their high tensile strength, their high tensile modulus, their resistance to most organic solvents, and their resistance to thermal degradation at moderate temperatures such as about 200° C. However, thermal gravimetric analysis shows that PBZ polymers experience a serious loss of polymer weight during prolonged exposure to temperatures between about 250° C. and about 400° C., which limits their utility for use in very high temperature applications. Furthermore, polybenzazoles are soluble in many strong acids, such as methanesulfonic acid. Most importantly, the compressive strength of PBZ polymers is much lower than their tensile strength, and this seriously limits their utility in structural applications.

What are needed are new polybenzazole polymers or compositions, having improved stability in high temperatures, improved resistance to acids, and/or better compressive strength.

SUMMARY OF THE INVENTION

One aspect of the invention is a poly(aromatic sulfide) polymer or oligomer comprising:
(1) a first aromatic group ($Ar^1$):
(2) two electron-deficient carbon groups (Q) bonded to said first aromatic group;
(3) a poly(aromatic sulfide) block bonded to the first aromatic group, said poly(aromatic sulfide) block having a plurality of mer units, which each contain:
  (a) an aromatic group ($Ar^s$); and
  (b) a sulfur atom linking said aromatic group ($Ar^s$) either to the first aromatic group ($Ar^1$) or to an aromatic group in an adjacent aromatic sulfide mer unit.

A second aspect of the present invention is a graft copolymer comprising (1) a polybenzazole block; and (2) a poly(aromatic sulfide) block grafted to said polybenzazole block, said poly(aromatic sulfide) block having a plurality of mer units, which each contain:
(a) an aromatic group ($Ar^s$); and
(b) a sulfur atom linking said aromatic group ($Ar^s$) either to an aromatic group ($Ar^1$) in the polybenzazole block or to an aromatic group ($Ar^s$) in an adjacent aromatic sulfide mer unit.

A third aspect of the present invention is a process for forming a cross-linked composition containing polybenzazole polymer, said process comprising heating a graft copolymer containing polybenzazole blocks and poly(aromatic sulfide) blocks grafted to said polybenzazole blocks to a temperature sufficient to induce cross-linking between the graft copolymer molecules.

A fourth aspect of the present invention is a cross-linked polymer composition containing polybenzazole polymer blocks, and poly(aromatic sulfide) blocks linking said polybenzazole blocks.

The grafted monomers are used to make the graft copolymers. The graft copolymers can be formed into shaped articles such as fibers, films and other shaded articles by known methods. Graft copolymers in the shaped articles can be cross-linked to form shaped articles containing the cross-linked polymer composition. The cross-linked graft copolymer exhibits a lower solubility in strong acids, a higher resistance to thermal degradation and a higher compressive strength than do corresponding uncross-linked homopolymers.

DETAILED DESCRIPTION OF THE INVENTION

Definitions

The following terms are used repeatedly throughout this application, and have the meaning and preferred embodiments defined herein unless otherwise specified.

AA-Monomer—A monomer suitable for synthesizing polybenzazole polymers, comprising two electron-deficient carbon groups linked by a divalent organic moiety (DM) which is inert with respect to all reagents under polybenzazole polymerization conditions. The electron-deficient carbon groups have the definition and preferred embodiments given herein. The divalent organic moiety is preferably alkyl or an aromatic group, as herein defined, is more preferably an aromatic group, and is most preferably a six-membered aromatic group. Examples of suitable AA-monomers and references to their synthesis are provided in U.S. Pat. No. 4,533,693 at Columns 25–32, Tables 4–6, which is incorporated herein by reference. Preferred examples of AA-monomers include terephthalic acid, isophthalic acid, bis-(4-benzoic acid) and oxy-bis-(4-benzoic acid) and acid halides thereof.

AB-Monomer—A monomer suitable for synthesizing polybenzazole polymers, comprising an aromatic group, an o-amino-basic moiety bonded to the aromatic group, and an electron-deficient carbon group bonded to the aromatic group. The aromatic group, the electron-deficient carbon group and the o-amino-basic moiety have the definitions and preferred embodiments given herein. Examples of suitable AB-monomers and processes for their synthesis are provided in U.S. Pat. No. 4,533,693 at Columns 33–35, Tables 7–8, which is incorporated herein by reference. Preferred examples of AB-monomers include 3-amino-4-hydroxybenzoic acid, 3-hydroxy-4-aminobenzoic acid and the acid halides thereof. AB-monomers are frequently stored as salts of hydrogen chloride or phosphoric acid, because the free-base of the monomer is unstable susceptible to air oxidation.

o-Amino-basic moiety—a moiety, which is bonded to an aromatic group, consisting of
(1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties (DL) which are inert with respect to PBZ polymerizing reagents under polymerization conditions. Suitable divalent moieties comprise, for example, a carbonyl group, a sulfonyl group, an oxygen atom, a sulfur atom, an alkyl group and/or a perfluorinated alkyl group. Each aromatic group is preferably a single six-membered ring.

Each aromatic group may contain substituents which are stable in solvent acid and do not interfere with further reactions of the moiety which the aromatic group is part of. Examples of preferred substituents include halogens, alkoxy moieties, aryloxy moieties or alkyl groups. More preferred substituents are either an alkyl group having no more than about 6 carbon atoms or a halogen. Most preferably, each aromatic group contains only those substituents specifically called for hereinafter.

Azole ring—an oxazole, thiazole or imidazole ring. The carbon atom bonded to both the nitrogen atom and the oxygen, sulfur or second nitrogen atom is the 2-carbon, as depicted in Formula 1

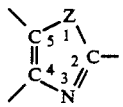

1 wherein Z is —O—, —S— or —NR—; and R is hydrogen, an aromatic or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbon of each azole ring is ordinarily fused with an aromatic group.

Azole-forming moiety—an "o-amino-basic moiety" or "electron-deficient carbon group," as those terms are defined herein.

BB-Monomer—A monomer suitable for synthesizing polybenzazole polymers, comprising an aromatic group and two o-amino-basic moieties which are bonded to the aromatic group. The aromatic group and the o-amino-basic moieties have the definitions and preferred embodiments given herein. Examples of suitable BB-monomers and processes for synthesis are provided in U.S. Pat. No. 4,533,693 at Columns 19–24, Tables 1–3, which is incorporated herein by reference. Examples of preferred BB-monomers include 4,6-diaminoresorcinol, 2,5-diaminohydroquinone and 1,4-dithio-2,5-diaminobenzene. BB-monomers are frequently stored as salts of hydrogen chloride or phosphoric acid, because the free base of the monomer is susceptible to air oxidation.

Electron-deficient carbon group (Q)—any group containing a carbon atom which can react in the solvent acid with an o-amino-basic moiety to form an azole ring, such as the groups listed in Column 24, lines 59–66 of the 4,533,693 patent, which is incorporated herein by reference. Examples of electron-deficient carbon groups include carboxylic acids, acid halides, metal carboxylate salts, ortho-ester groups, cyano groups and trihalomethyl groups. Preferred electron-deficient carbon groups are carboxylic acids and acid halides. Halogens in electron-deficient carbon groups are preferably chlorine, bromine or iodine and more preferably chlorine.

Polybenzazole (PBZ) polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each mer unit contains an oxazole ring bonded to an aromatic group, which need not necessarily be a benzene ring. The term "polybenzoxazole (PBO)" also refers broadly to poly(phenylene-benzobis-oxazole)s and other polymers wherein each mer unit comprises a plurality of oxazole rings fused to an aromatic group. The same understandings shall apply to the terms polybenzothiazole (PBT) and polybenzimidazole (PBI).

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer," Kansai Committee of the Society of Fiber Science and Technology, Japan, Post Symposium on Formation, Structure and Properties of High Modulus and High Tenacity Fibers 23–26 (Aug. 26, 1985); Evers et al, "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermoxadatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and have a persistence length comparable to their contour length. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

Solvent acid—any non-oxidizing liquid acid capable of dissolving PBZ polymers, such as sulfuric acid, methanesulfonic acid, trifluoromethylsulfonic acid, polyphosphoric acid and mixtures thereof. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide. Polyphosphoric acid preferably has a $P_2O_5$ content by weight of at least about 70 percent, more preferably at least about 75 percent and preferably has a $P_2O_5$ content of at most about 90 percent, more preferably at most about 85 percent. The ratio of methanesulfonic acid to phosphorus pentoxide in mixtures of those compounds is preferably no more than about 20:1 by weight and no less than about 5:1 by weight.

Poly(Aromatic Sulfide) Moieties Bonded to AA-Monomer Moieties

One aspect of the present invention is a poly(aromatic sulfide) polymer or oligimer bonded to an AA-monomer moiety, which preferably is a terminating end group. The poly(aromatic sulfide) polymer or oligimer preferably comprises:

(1) a first aromatic group ($Ar^1$);
(2) two electron-deficient carbon groups (Q) bonded to said first aromatic group; and
(3) a poly(aromatic sulfide) block bonded to the first aromatic group, said poly(aromatic sulfide) block having a plurality of mer units which each comprise:
   (a) an aromatic group ($Ar^s$); and
   (b) a sulfur atom linking said aromatic group ($Ar^s$) either to the first aromatic group ($Ar^1$) or to an aromatic group in an adjacent aromatic sulfide mer unit.

The aromatic group and the electron-deficient carbon groups have the meaning and preferred embodiments previously defined. The electron-deficient carbon groups are preferably in meta or para position with respect to each other and more preferably in para position with respect to each other.

The poly(aromatic sulfide) block comprises at least two aromatic sulfide mer units. Each aromatic sulfide mer unit comprises an aromatic group ($Ar^s$) bonded to a sulfur atom. The sulfur atom of the first aromatic sulfide mer unit is also bonded to the first aromatic group ($Ar^1$). Subsequent aromatic sulfide mer units are linked by a bond from the sulfur atom to the aromatic group ($Ar^s$) of an adjacent aromatic sulfide mer unit.

Aromatic groups within the poly(aromatic sulfide) block have the broad description and preferred embodiments previously defined. Each aromatic group ($Ar^s$) is preferably independently a meta- or para-phenylene moiety. Each poly(aromatic sulfide) block preferably contains both meta- and para-phenylene moieties. The phenylene moieties in each poly(aromatic sulfide) block are preferably at least about 50 percent para, more preferably at least about 75 percent para. They are preferably at least about 5 percent meta, more preferably at least about 10 percent meta. Suitable aromatic sulfide mer units and polyaromatic sulfide polymers are described in 10 Ency. of Poly. Sci. & Tech., Poly(arylene Sulfides), 653–59 (J. Wiley & Sons 1969).

The number of aromatic sulfide mer units in each individual poly(aromatic sulfide) block may vary randomly within a given sample. Each poly(aromatic sulfide) block preferably comprises on average at least about 3 aromatic sulfide mer units, more preferably at least about 5, and most preferably at least about 9. Each poly(aromatic sulfide) block preferably comprises on average no more than about 50 aromatic sulfide mer units more preferably no more than about 30, and most preferably no more than about 20. Sulfur atoms are preferably bonded to aromatic groups within the poly(aromatic sulfide) block in either meta or para position with respect to each other. More preferably, at least about 50 percent are in para position with respect to each other and at least about 10 percent are in meta position with respect to each other. Most preferably, between 70 and 80 percent are in para position with respect to each other and between 20 and 30 percent are in meta position with respect to each other.

The poly(aromatic sulfide) polymer or oligimer bonded to an AA-monomer moiety preferably conforms to formula 4(a)

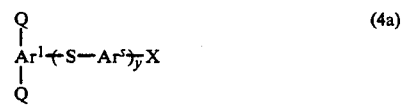

wherein $Ar^1$ is a first aromatic group as previously described, $Ar^s$ is an aromatic group in an aromatic sulfide mer unit as that group is previously describe, each Q is an electron-deficient careen group as previously described, X is either hydrogen or a halogen or similar displaceable group and y is a number of repeating aromatic sulfide mer units having the limitations and preferred embodiments previously described. The poly(aromatic sulfide) polymer or oligimer more preferably conforms to formula 4(b)

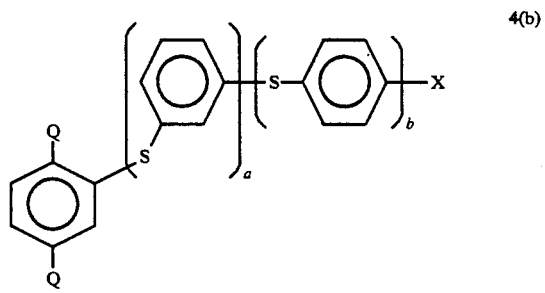

wherein:
each Q and X has the meaning and preferred embodiments previously given,
a defines a number of aromatic sulfide mer units in which sulfur atoms are bonded in meta position,
b defines a number of aromatic sulfide mer units in which sulfur atoms are bonded in para position,
the meta mer units and the para mer units are throughout the poly(aromatic sulfide) block in a random fashion, and
a and b totaled together equal y.

The poly(aromatic sulfide) polymer or oligimer bonded to an AA-monomer moiety can be synthesized by contacting a halogenated AA-monomer with aromatic sulfide monomers and/or polyaromatic sulfide polymer or oligimer in an appropriate solvent under conditions suitable for nucleophilic substitution. The synthesis of polyaromatic sulfide by nucleophilic substitution is well-known. Suitable reactions are described in 10 Ency. of Poly. Sci. & Tech., supra, at 653–54, which is incorporated herein by reference.

For instance, monomers containing an aromatic group ($Ar^s$), a halogen or similar displaceable group (X) bonded to the aromatic group, and a thiol or the metal salt of a thiol bonded to the aromatic group, react in the presence of a base or under suitable dissociating conditions to form polyaromatic sulfide polymer by displacement of the halogen by the sulfide moiety. Suitable monomers, such as m- and p-bromo-thiophenol are commercially available, and others can be synthesized by substitution of reagents into known processes, such as are described in 6 Bielstein's Handbuch der Organischen Chemie 330 & 1047, which is incorporated herein by reference.

The reaction is preferably carried out in an organic solvent such as n-methylpyrrolidinone or a mixture of n-methylpyrrolidinone and toluene. The reaction is preferably carried out under inert atmosphere, such as nitrogen. When the monomer contains a thiophenol moiety, rather than the metal salt of a thiophenol moiety, then the reaction is preferably driven by the presence of a strong base, such as sodium or potassium hydroxide, the temperature for the reaction is preferably at least about 100° C. more preferably at least about 150° C. and most preferably at least about 190° C.

The halogenated AA-monomer may be part of the polymerization mixture from the beginning, or may be added to the polymerization mixture after the polyaromatic sulfide is partially or completely polymerized. The halogenated AA-monomer comprises an aromatic group, two electron-deficient carbon groups bonded to the aromatic group, and at least one halogen atom bonded to the aromatic group. The halogenated monomer may contain more than one halogen atom if an AA-monomer having more than one poly(aromatic sulfide) block is desired.

Certain halogenated AA-monomers, such as 2-bromoterephthalic acid, are commercially available and others may be synthesized by known techniques, such as potassium permanganate oxidation of halogenated xylene, as described in Clarke et al., 2 Organic Synthesis 135-36 (J. Wiley & Co. 1943), which is incorporated herein by reference. The ratio of halogenated AA-monomer to aromatic sulfide monomer is determined by the desired average poly(aromatic sulfide) block length. The molar ratio of aromatic sulfide monomer to halogenated AA-monomer is preferably at least about 5:1, more preferably at least about 9:1, and preferably at most about 50:1, more preferably at most about 30:1, and most preferably at most about 20:1. The halogenated AA-monomer is reacted under the conditions previously described.

The resulting poly(aromatic sulfide) polymer or oligimer containing an AA-monomer moiety can be used to synthesize graft copolymers of the present invention.

Graft Copolymers Containing Polybenzazole Blocks and Grafted Poly(aromatic sulfide) blocks Graft copolymers are synthesized by the reaction of BB-monomers with poly(aromatic sulfide) polymers or oligomers containing AA-monomer moieties, as that term is previously defined, under conditions suitable for the synthesis of PBZ polymers. The reaction of AA- and BB-monomer to produce PBZ polymers is well-known in the art and is described fully in references previously incorporated herein. The reaction preferably takes place in a dehydrating solvent acid, such as polyphosphoric acid or a mixture of methanesulfonic acid and polyphosphoric acid or phosphorous pentoxide. The reaction is preferably carried out under an inert atmosphere, such as nitrogen, helium or neon. The temperature of the reaction preferably commences at a temperature no higher than about 60° C. and is increased throughout the course of the reaction until the temperature reaches at least about 100° C. more preferably at least about 150° C., and most preferably at least about 190° C. The temperature of the reaction preferably does not exceed 230° C., more preferably 210° C. The reaction mixture must be vigorously agitated in order to obtain high molecular weight.

The reaction mixture preferably contains about equimolar quantities of AA- and BB-monomer, or a slight excess of AA-monomer. Not all AA-monomer need be bonded to poly(aromatic sulfide) blocks, although all may. Preferably at least about 1 percent of the AA-monomers are bonded to poly(aromatic sulfide) blocks, more preferably at least about 4 percent. Preferably, no more than about 40 percent of the AA-monomers are bonded to poly(aromatic sulfide) blocks, more preferably no more than about 20 percent. The weight ratio of poly(aromatic sulfide) blocks to polybenzazole-forming monomers in the solution may be from 1:99 to 99:1. It is preferably at least about 5:95, more preferably at least about 10:90, and most preferably at least about 30:70. The weight ratio is preferably at most about 50:50 and more preferably at most about 40:60.

Certain obvious variations may be made in the monomers used in order to produce obvious variations in the resulting polymers. The polymerization mixture may contain AB-monomer, to provide a copolymer having both AA/BB- and AB-polybenzazole structures. The AB- and BB-monomers may contain mixtures of monomers appropriate to form polybenzoxazole, polybenzothiazole and/or polybenzimidazole structures. The reaction mixture may comprise a small quantity of monofunctional reagent, such as benzoic acid or o-aminophenol, to serve as end-capping monomers, as described in U.S. Pat. No. 4,703,403, which is incorporated herein by reference. Poly(aromatic sulfide) polymers and oligomers of the present invention may be reacted to insert into the polybenzazole polymer chain in a random fashion or in concentrated blocks. They are preferably inserted into the polybenzazole polymer in a random fashion.

The resulting polymer comprises blocks of polybenzazole polymer having poly(aromatic sulfide) blocks grafted thereto. The poly(aromatic sulfide) blocks have the description and preferred embodiments previously set out in describing poly(aromatic sulfide) polymer or oligimer. Each poly(aromatic sulfide) block is grafted to an aromatic group ($Ar^1$) within the polybenzazole block. Each electron-deficient carbon group on the AA-monomer typically reacts with an o-amino-basic moiety to form an azole ring having a single bond from the 2-carbon of the azole moiety to the aromatic group ($Ar^1$). The aromatic group usually serves as the divalent organic moiety (DM) in an AA/BB-mer unit as previously. However, when the reaction mixture contains AB-monomers as well, then the AA-monomer may react with o-amino-basic moieties in one or more AB-monomers to produce structural variations obvious to persons of ordinary skill in the art.

Each AA/BB-PBZ mer unit of the graft copolymer which has a pendant poly(aromatic sulfide) block preferably comprises:

(1) a first aromatic group ($Ar^1$);
(2) a second aromatic group ($Ar^2$);
(3) a first and a second azole ring fused with the second aromatic group ($Ar^2$), having a single bond from the first azole ring to the first aromatic group ($Ar^1$); and
(4) a poly(aromatic sulfide) block bonded to the first aromatic group ($Ar^1$).

Each mer unit which has a pendant poly(aromatic sulfide) block preferably conforms to formula 5(a)

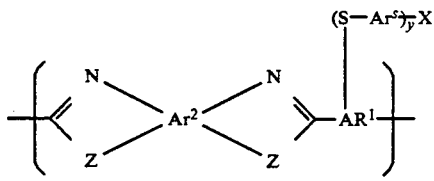

wherein:
Ar[1] is a first aromatic group,
Ar[2] is a second aromatic group,
Ar[s] is an aromatic group in an aromatic sulfide mer unit,
X is a hydrogen atom or a halogen or other displaceable group,
Y is a number of repeating aromatic sulfide mer units as those terms are previously described and
Z has the meaning previously defined in defining azole rings.

Each mer unit having a pendant poly(aromatic sulfide) block more preferably conforms to formula 5(b)

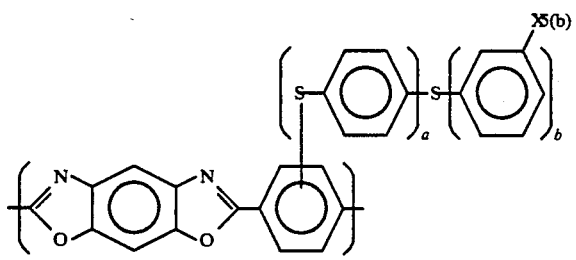

wherein a, b and X have the meanings previously given. Mer units in the polybenzazole block which do not have pendant poly(aromatic sulfide) blocks preferably conform to the description given in the Background of the Invention and to one of Formulae 1(a) or (b). The percentage of polybenzazole mer units which are bonded to a pendant poly(aromatic sulfide) block is preferably about equal to percentage of AA-monomers in the polymerization mixture which are bonded to a poly(aromatic sulfide) block, and has the same description and preferred embodiments.

The polymerization process described previously yields an acid dope containing the previously described graft copolymers. The graft copolymers are precipitated by diluting the acid with a diluent such as water. The graft copolymer may be coagulated to form a shaped article such as fibers or films by extrusion using known techniques as are described in 11 Ency. Poly. Sci. & Eng., supra, at 625-28; U.S. Pat. No. 4,533,693 at Columns 82-84; Hwang et al., "Solution Processing and Properties of Molecular Composite Fibers and Films," 23 Poly. Eng. & Sci. 784, 785 (1984); and Hwang et al., "Composites on a Molecular Level: Phase Relationships, Processing, and Properties," B22(2) J. Macromol. Sci.-Phys. 231, 234-35 (1983), which are incorporated herein by reference. Films and fibers can be used in composites and laminates as described in 11 Ency. Poly. Sci. & Eng., supra, at 625-30, which is incorporated herein by reference.

Shaped articles are preferably formed from an anisotropic dope. Optical isotropy and anisotropy of the dope can be determined by a number of tests familiar to persons of ordinary skill in the art, such as those described in Hwang et al., "Composites on a Molecular Level: Phase Relationships, Processing, and Properties," B22(2) J. Macromol. Sci.-Phys. 231, 234-35 (1983), which is incorporated by reference. A simple method is to see if the solution exhibits birefringence when viewed under a microscope under cross-polar conditions. Conditions which can affect whether a particular dope is isotropic or anisotropic include the size and concentration of the polybenzazole block, the level of articulation in the polybenzazole block, the solvent acid and the temperature. Appropriate conditions will vary with individual dopes and can readily be determined by persons of ordinary skill in the art.

The coagulated graft copolymer can be cross-linked by heating at sufficient temperature and for sufficient time to cross-link the poly(aromatic sulfide) blocks. The optimum time for heating depends upon the temperature at which the graft copolymer is heated and vice versa. The temperature is preferably between about 500° C. and about 600° C. The time must be short enough to minimize polymer degradation. At 500° C., the time of heating is preferably between about 30 and 60 seconds.

Fibers containing the cross-linked polymer preferably have compressive strength which is at least about 10 percent higher than the compressive strength of ungrafted polybenzazole produced by a similar process. The improvement in compressive strength is more preferably at least 15 percent and most preferably at least 20 percent. The heat treated polymer is preferably substantially insoluble in methanesulfonic acid at 25° C. When thermal stability is measured by thermogravimetric analysis, the cross-linked polymer is preferably thermally stable at 300° C., more preferably at up to 350° C., and most preferably at up to 400° C.

ILLUSTRATIVE EXAMPLES

The following examples are for illustrative purposes only and are not to be taken as limiting either the scope of the specification or the claims. Unless stated otherwise, all parts and percentages are given by weight.

EXAMPLE 1

Synthesis of 2-(Polyphenylene Sulfide) Terephthalic Acid

The amounts of 4-bromothiophenol (4-BTP), 3-bromothiophenol (3-BTP), potassium hydroxide (KOH), 2-bromoterephthalic acid (BTA), toluene (Tol) and N-methylpyrrolidinone (NMP) shown in Table I are mixed together under nitrogen atmosphere with vigorous stirring. Water and toluene are distilled off at about 150° C. Thereafter, the temperature of the mixture is raised to 200° C., and the mixture is stirred with heating for 48 hours. The mixture is cooled to room temperature, NMP is removed and dilute hydrochloric acid is added. The resulting precipitate is washed with water and extracted with boiling toluene. Each example provides the weight of 2-(polyphenylene sulfide) terephthalic acid shown in Table I.

TABLE I

| Ex. | 4-BTP (g) | 3-BTP (g) | BTA (g) | KOH (g) | Tol (g) | NMP (g) | Yield (g) |
|---|---|---|---|---|---|---|---|
| A | 26 | 5 | 1.83 | 10.85 | 10 | 200 | 15.0 |
| B | 11 | 0 | 1.00 | 3.9 | 50 | 120 | 6.5 |
| C | 74 | 15 | 5.48 | 32.40 | 120 | 500 | 43.2 |
| D | 35 | 5 | 2.25 | 14.00 | 150 | 350 | 21.0 |

EXAMPLE 2

Synthesis of 2-(Polyphenylene Sulfide) Terephthaloyl Chloride and Terephthalate Esters A 0.5-g quantity of each 2-(polyphenylene sulfide)-terephthalic acid produced in Examples 1 (A), (C) and (D), is refluxed in excess thionyl chloride for 24 hours. The thionyl chloride is removed and the acid chloride is recovered. Excess methanol is added to the acid chloride and it is stirred at room temperature for about 24 hours. Methanol is removed and dimethyl 2-(polyphenylene sulfide)-terephthalate is recovered.

EXAMPLE 3

Synthesis of Polybenzoxazole (PBO)/Polyphenylene Sulfide (PPS) Graft Copolymer A mixture of 4.589 g of 4,6-diaminoresorcinol di(hydrogen chloride), 3.504 g of micronized terephthalic acid and 2.3 g of 2-(polyphenylene sulfide)-terephthalic acid having an average molecular weight of about 2620 is stirred in 30 g of polyphosphoric acid under nitrogen atmosphere at 70° C. for 4 hours. The temperature is increased to 90° C. and 8 g of $P_2O_5$ is added. The mixture is heated with stirring at 90° C. for 20 hours, at 120° C. for 3 hours, at 150° C. for 4 hours, at 170° C. for 2 hours and at 190° C. for 16 hours. The resulting dope, containing the title graft copolymer, is spun into fiber. The fiber is washed with boiling water and extracted with 1-chloronaphthalene at 200° C. for 0.5 hours to remove ungrafted poly(aromatic sulfide). The polymer is washed with dichloromethane to remove 1-chloronaphthalene and dried. The polymer is soluble in methanesulfonic acid and has an intrinsic viscosity of 23.6 dL/g (estimated) at 25° C.

EXAMPLE 4

Cross-linked Graft Copolymer

A 30-mg sample of fiber from Example 3 is heated in an oven at 310° C. for 7 hours. An 11.2-mg quantity of the heat treated fiber is placed in 25 ml of methanesulfonic acid. The polymer partially dissolves, but large portions of it remain insoluble after 4 days of shaking. Heat treated and nonheat treated fiber is examined by thermogravimetric analysis under nitrogen atmosphere at a heating rate of 10° C./min. in a range from 50° C. to 600° C. The nonheat treated fiber retains about 100 percent of its weight at 200° C., about 98.5 percent of its weight at 300° C., about 97 percent of its weight at 400° C., and about 93 percent of its weight at 500° C. The heat treated fiber retains about 100 percent of its weight to 400° C. and about 96 percent of its weight at 500° C.

EXAMPLE 5

Synthesis of PBO/PPS Graft Copolymer

A mixture of 45.3 g of 4,6-diaminoresorcinol di(hydrogen chloride), 35.6 g of micronized terephthalic acid and 31 g of 2-(polyphenylene sulfide) terephthalic acid having an average molecular weight of about 2620 is stirred in 303 g of polyphosphoric acid under nitrogen atmosphere for 4 hours at 70° C. The temperature is increased to 93° C. and 81 g of $P_2O_5$ is added in three portions. The mixture is heated with vigorous stirring at 93° C. for 20 hours, at 110° C. for 4 hours, at 125° C. for 20 hours and at 150° C. for 3 hours. The heating at 150° C. is under vacuum. After 3 hours at 150° C., the dope is transferred to a piston-agitated reactor and reacted at 210° C. for 2 hours. A portion of the dope is spun and coagulated in water to form fiber. The fiber is washed with water and extracted with 1-chloronaphthalene at 200° C. for 0.5 hour and with boiling dichloromethane. The polymer is dried in a vacuum oven. A sample is soluble in methanesulfonic acid. A portion of the fiber is heated in an air circulated oven at 310° C. for 6 hours. The resulting fiber is no longer soluble in methanesulfonic acid.

EXAMPLE 6

Synthesis of PBO/PPS Graft Copolymer

A mixture of 75.0 g of 4,6-diaminoresorcinol di(hydrogen chloride), 57.3 g of micronized terephthalic acid, 35.1 g of micronized 2-(polyphenylene sulfide) terephthalic acid having an average molecular weight of about 2200 is stirred in 478 g of polyphosphoric acid at 70° C. for 4 hours. A 131-g quantity of $P_2O_5$ is added and the temperature is increased to 95° C. The mixture is heated with vigorous agitation at 95° C. for 16.5 hours, at 120° C. for 4 hours and at 150° C. for 2 hours. The dope is transferred to a piston-agitated reactor and heated at 170° C. for 2 hours and at 190° C. for 16 hours.

The dope is spun and coagulated into fiber using a 10-mil spinnerette having 36 holes. The fibers are spun at 160° C. with a spin-draw ratio of 27 and at 150° C. with a spin-draw ratio of 29. The as spun fiber dissolves in methanesulfonic acid and has an intrinsic viscosity of 24 dL/g (estimated). After ungrafted poly(aromatic sulfide) is removed by washing in 1-chloronaphthalene, the fiber which was spun at 160° C. and spin-draw ratio of 27 is heated in a 24-in. tube furnace under nitrogen atmosphere with a residence time of 30 seconds. Temperatures are shown in Table II. Fibers heat treated at above 550° C. broke up but did not dissolve in methanesulfonic acid. Fibers heat treated at 600° C. did not break up or dissolve in methanesulfonic acid. On the other hand, comparable PBO fiber without grafted polyphenylene sulfide dissolved almost completely in methanesulfonic acid after heat treatment at 600° C.

The compressive strength of the heat treated fibers is measured by the unidirectional minicomposite method published in Bonk et al., *PBX Fiber Mechanical Properties*, Interim Report AFWAL-TR-88-4131 (August 1988), which is incorporated herein by reference. To test by this method, the fiber is made part of a minicomposite by methods similar to those described in ASTM D-695, and the compressive strength of that minicomposite is measured directly. The compressive strength of comparable PBO fiber which does not have grafted polyphenylene sulfide is also measured. The results are set out in Table II.

TABLE II

| Ex. | Temp (°C.) | Compressive Str (Ksi) |
|---|---|---|
| PBO[1] | 600 | 45 |
| E | 590 | 49.0 ± 0.6 |
| F | 600 | 53.5 ± 2.3 |
| G | 650 | 54.7 ± 0.1 |
| H[2] | 610 | 51.6 |

[1] Not an example of the invention
[2] Fiber spun at 150° C. with spin-draw ratio of 29

What is claimed is:

1. A process for synthesizing a cross-linked composition containing polybenzazole polymer, said process comprising heating a graft copolymer containing polybenzazole blocks and poly(aromatic sulfide) blocks grafted to said polybenzazole blocks to a temperature sufficient to induce cross-linking between the graft copolymer molecules.

2. The process of claim 1 wherein azole rings in the polybenzazole block of the graft copolymer are independently oxazole or thiazole rings.

3. The process of claim 2 wherein the polybenzazole block of the graft copolymer consists essentially of polybenzoxazole polymer.

4. The process of claim 2 wherein the polybenzazole block of the graft copolymer is a rigid rod block.

5. The process of claim 2 wherein each block of poly(aromatic sulfide) polymer in the graft copolymer contains on average at least about 3 mer units.

6. The process of claim 5 wherein each block of poly(aromatic sulfide) polymer in the graft copolymer contains on average between about 5 mer units and about 50 mer units.

7. The process of claim 6 wherein each block of poly(aromatic sulfide) polymer in the graft copolymer contains on average between about 9 mer units and about 30 mer units.

8. The process of claim 6 wherein the weight ratio of poly(aromatic sulfide) to polybenzazole in the graft copolymer is at least about 5:95 and at most about 40:60.

9. The process of claim 8 wherein each aromatic group in the poly(aromatic sulfide) blocks is a six-membered ring chosen such that at least about 50 percent of the aromatic groups are in the poly(aromatic sulfide) blocks are p-phenylene groups and at least about 10 percent are m-phenylene groups.

10. The process of claim 8 wherein the graft copolymer is exposed to a temperature of at least about 310° C. during cross-linking.

11. The process of claim 10 wherein the temperature of cross-linking at least about 500° C. for at least about 30 seconds.

* * * * *